(12) United States Patent
Zabihi

(10) Patent No.: US 6,449,895 B1
(45) Date of Patent: Sep. 17, 2002

(54) AUTOMATIC FISHING DEVICE WITH ELECTRICAL LINE AND LURE

(76) Inventor: Martin Zabihi, 16 Lincoln Close, North Harrow, Middlesex, HA2 7RJ (GB)

( * ) Notice: Subject to any disclaimer, the term of this patent is extended or adjusted under 35 U.S.C. 154(b) by 0 days.

(21) Appl. No.: 09/756,156

(22) Filed: Jan. 5, 2001

Related U.S. Application Data

(60) Provisional application No. 60/174,447, filed on Jan. 5, 2000.

(51) Int. Cl.[7] ............................................. A01K 87/06
(52) U.S. Cl. ..................................... 43/21; 43/4; 43/15
(58) Field of Search ........................... 43/4, 18.1, 15, 43/16, 21, 17.6, 19.2, 42.31; 242/223

(56) References Cited

U.S. PATENT DOCUMENTS

| | | | | |
|---|---|---|---|---|
| 3,685,195 A | * | 8/1972 | Merryweather et al. | 43/18 |
| 4,349,978 A | * | 9/1982 | Philip | 43/19.2 |
| 4,380,132 A | * | 4/1983 | Atkinson | 43/26.2 |
| 4,625,446 A | * | 12/1986 | Morimoto | 43/17 |
| 5,010,679 A | * | 4/1991 | Tischer | 43/42.04 |
| 5,511,335 A | * | 4/1996 | Langer | 43/4 |
| 5,732,501 A | * | 3/1998 | Ausburn | 43/5 |
| 5,938,469 A | * | 8/1999 | Ford et al. | 439/459 |
| 6,056,218 A | * | 5/2000 | Nanbu | 242/223 |
| 6,098,331 A | * | 8/2000 | Kim et al. | 43/4.5 |

FOREIGN PATENT DOCUMENTS

JP 64-37238 * 2/1989

* cited by examiner

*Primary Examiner*—Peter M. Poon
*Assistant Examiner*—David Parsley
(74) *Attorney, Agent, or Firm*—Jeffrey Slusher

(57) ABSTRACT

A spinning reel for fishing includes a motor that, when activated, automatically reels in a fishing line when a fish bites a hook, whose inner end forms a contact arm of an electrical sensor in the lure. An electrical device such as a vibrator and-or light is also included within the lure in order to help attract fish. Electrical wires lead from the reel to the lure.

5 Claims, 2 Drawing Sheets

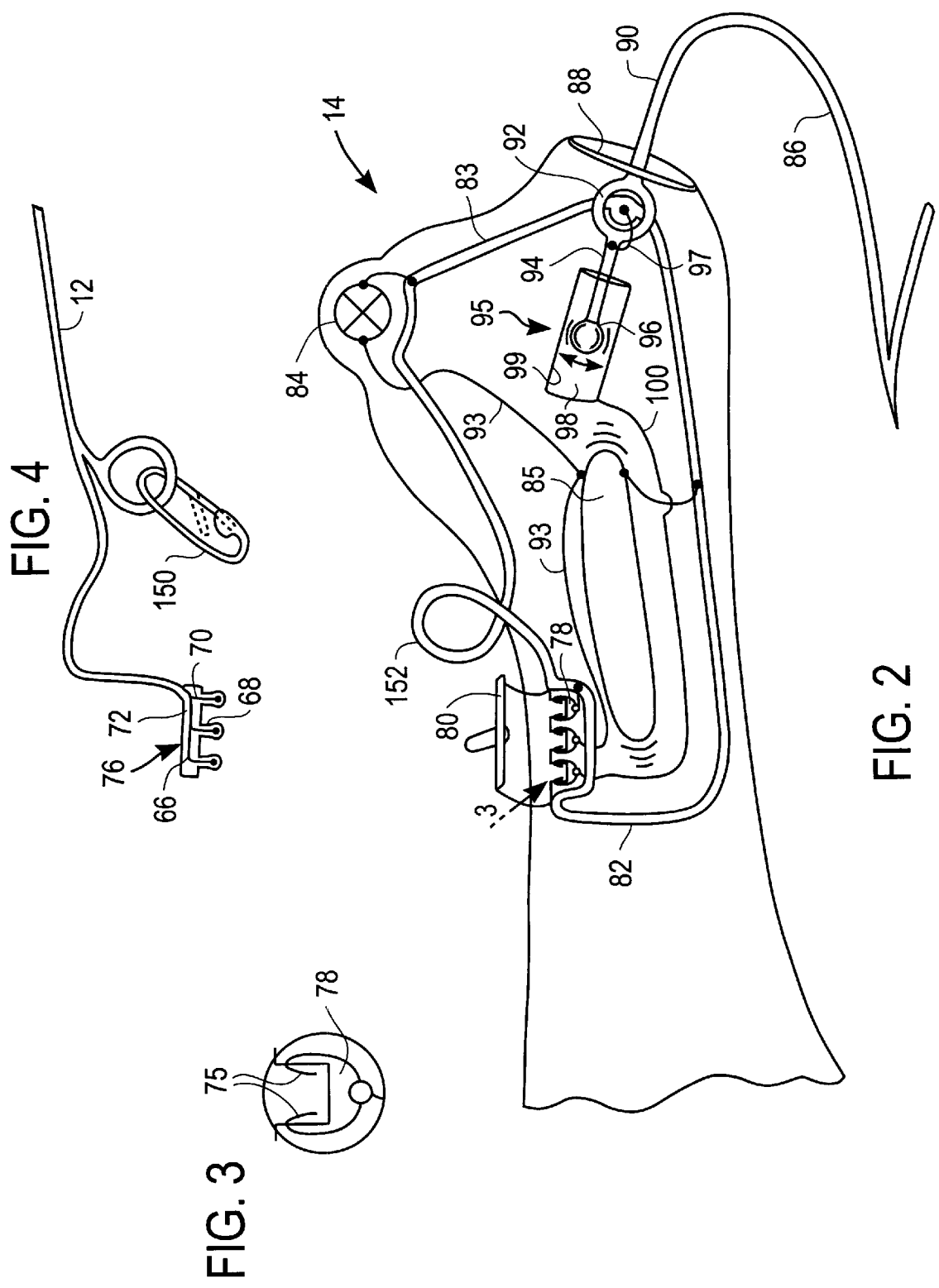

AUTOMATIC FISHING DEVICE WITH ELECTRICAL LINE AND LURE

CROSS-REFERENCE TO RELATED APPLICATIONS

This application claims priority from U.S. Provisional Patent Application No. 60/174,447, filed Jan. 5, 2000.

BACKGROUND OF THE INVENTION

1. Technical Field

This invention relates to fishing gear, in particular, to a combination of a reel, rod, line and lure that can automatically reel in the lure. The invention also relates specifically to the lure itself, which has improvements designed to better attract fish.

2. Description of the Related Art

Fishermen are always interested in attracting more fish to the hook. In general, lures are passive devices and rely on having a shape, coloring and hydrodynamic design that, underwater, are attractive to particular species.

Unfortunately, some who love to fish cannot do so because of some physical handicap. For example, some of those can hold a rod may not be able to operate the crank of a spinning reel well enough to set the hook and reel in a fish.

What is needed is therefore fishing gear that better attracts fish, or that makes it easier even for the handicapped to fish, and preferably both. This invention provides an arrangement of rod, reel lure and line that meets both needs.

BRIEF DESCRIPTION OF THE DRAWINGS

FIG. 2 is a detailed cross-sectional view of the fishing lure according to the invention;

FIG. 3 is a detailed view of a portion the electrical connector of the lure; and FIG. 4 is a detailed view of an outer end of the fishing line.

DETAILED DESCRIPTION

Figure 1:
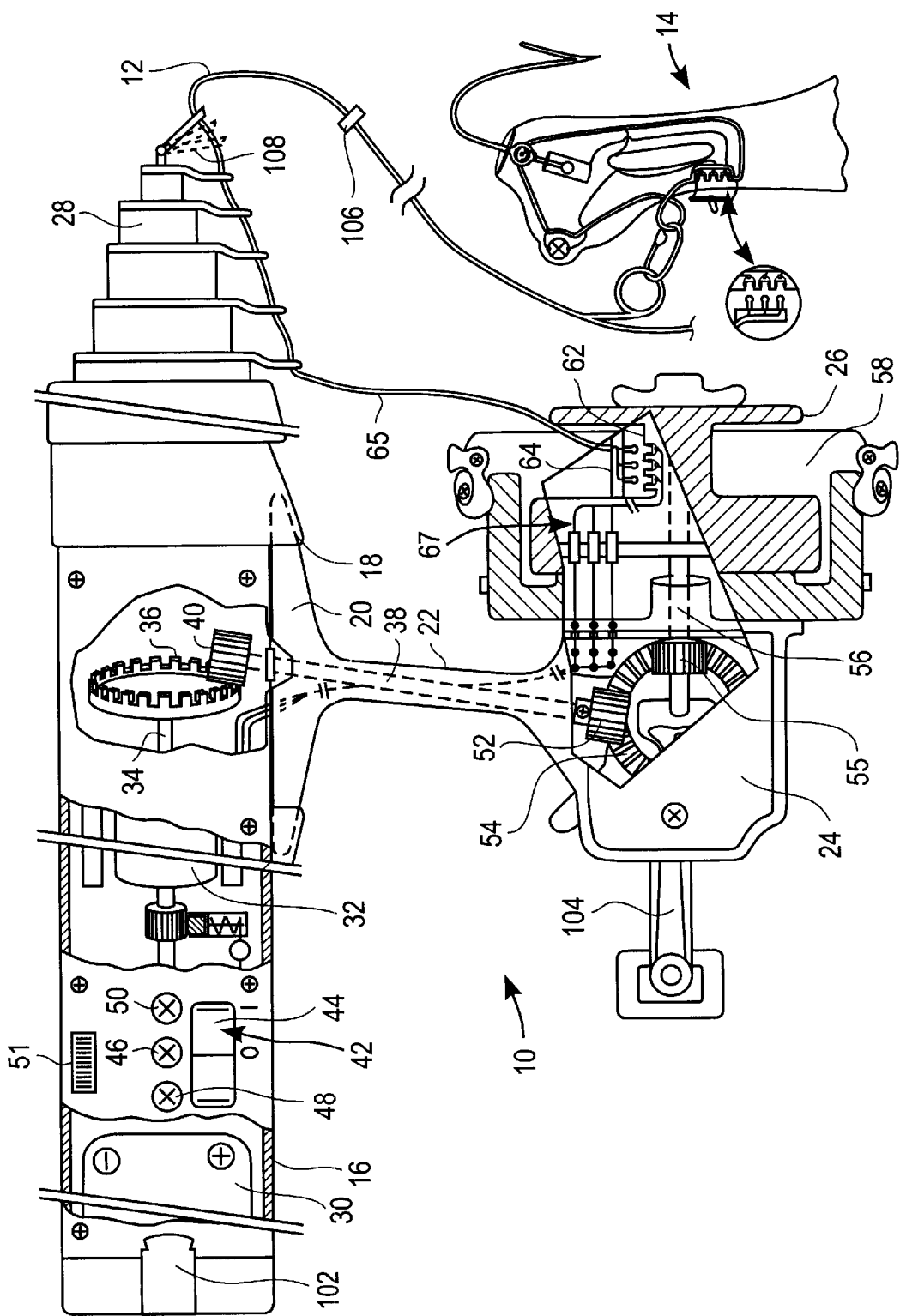
FIG. 1 is a cross-sectional view of a spinning reel, rod and lure according to the invention.

With reference to FIGS. 1–4, this invention is an automatic fishing device 10 that may be used to automatically reel in an electrical fishing line 12 when a fish is biting an electrical lure 14 connected to the line 12. This device is particularly suitable for individuals that are handicapped in such a way that it is difficult for them to hold the fishing rod and the spinning reel. Of course, this invention is also suitable for any fishermen that needs the automatic reeling in features.

The fishing device 10 has a butt grip 16 including a locking mechanism 18, such as the conventional screw-down collar, for holding a foot 20 of a hollow leg 22 of a spinning reel 24. The fishing line 12 is reeled up on a spool 26 and is held in place by butt guides on a rod 28. In FIG. 1 the rod is illustrated as being a telescopic spinning rod in the unextended position, although the invention is of course not limited to use with any particular type of rod. The fishing line may have a diameter of less than 1 millimeter such as about 0.2 millimeter. However, larger and smaller diameters may also be used depending upon the type of fishing the device is going to be used for.

The butt grip 16 is hollow and includes a voltage source 30 connected to an electrical motor 32. In order to make the invention compact and portable, the voltage source is preferably a battery of sufficient voltage and capacity to drive the motor 32. In one prototype of the invention, a 12V battery was sufficient. 12V also has the advantage that it is the standard voltage for most automobile and recreational boat batteries. The battery is therefore preferably rechargeable, for example, from the outlets usually found in automobiles and boats. It would also be possible to replace the in-grip battery 30 with a conventional plug-in connector to an external voltage source, although this will of course limit the use of the invention to fishing within the length of the extension cord that would then be needed.

The motor 32 should be able to operate at a very high revolutions per minute to facilitate a good acceleration when a fish bites the lure 14. The motor 32 has a shaft 34 extending along and inside the butt grip 16 and terminates in a crown wheel 36. The butt grip 16 has an instrument panel 42 which has an action switch/button 44, a battery indicator 46, a lure light 48 and an activation light and/or beeper 50.

In the preferred embodiment of the invention, the action switch/button 44 is preferably in the form of a single pole, triple-throw switch. By pushing the button 44 forward, the use activates the motor 32 and thus the fishing line 12. By pushing the button backward, the user activates the lure light and a vibration mechanism 85 mounted within the lure 14. When the action button is in the middle position, no action takes place. The grip 16 also has a speed control 51 to control the speed of the electrical motor 32; the speed control may be a simple adjustable potentiometer control. The speed control may also be used to turn on/off the electrical system to disconnect the battery so as not to drain the battery unnecessarily.

When the user presses the button 44 forward, the motor 32 reels in the fishing line 12. As explained below, the electric motor may also be in an automatic activation mode and will start reeling in the lure 14 only when a fish is biting the lure.

A second shaft 38 extends inside the hollow leg 22 and terminates in an upper cog gear 40 that is in operative engagement with the crown wheel 36 so that when the wheel 36 is rotated, the gear 40 is also rotated. The other end of the shaft 38 has a lower cog gear 52 that is in operative engagement with a crown wheel 54 that also engages a cog gear 55 mounted on a shaft 56 on which the line spool 26 is mounted. The crown wheel 36, cog gear 40,: shaft 38, cog gear 52, crown wheel 54, cog gear 55 and shaft 56 thus form a transmission such that when- the shaft 34 is rotated, the spool 26 is also rotated.

When not activated, the motor preferably freewheels so that the crown wheel 54 can be turned substantially unhindered by a conventional crank handle 104. Alternatively, any standard mechanism may be included in the reel to disengage the cog gear 52 from the crown wheel 54 when fully manual fishing is desired. Moreover, if the line is always to be reeled in by the motor, the handle 104 can be removed altogether.

As in conventional spinning reels, the spool 26 has a recess 58 in which the fishing line 12 is wound up and held ready.

In the illustrated, preferred embodiment of the invention, at least three electrical conductors lead from the reel, along (or within) the fishing line, and to connectors in the lure. The wires 65 are preferably disposed inside a nylon casing 72.

The wires 65 are preferably connected electrically to the battery via a three-contact female/male connector pair 62, 64 that is mounted on the spinning portion of the reel, with one connector attached to the reel and the other attached to one end of the fishing line. If these connectors are attached at the innermost recess of the groove 58, then they will not prevent the line from smoothly spooling off the reel or being reeled in. In order to avoid twisting and tangling the wires as the spinner spins, the three conductors in the connector 62 are preferably connected to three corresponding conductors in the reel housing via conventional commutation brushes 67.

One of the conductors connects one terminal of the battery to a vibrator 85 and/or a call light 84 in the lure via the action switch 44. Another one of the conductors (wire 70) connects the other terminal of the battery to a negative/ ground pole or grounding device, such as a frame 82 in the lure. The third conductor is a feed-back conductor connected to a one terminal of a bite sensor 95 in the lure, whose other terminal is connected to the grounding device. The line 12 may also carry more or less than three wires therein depending upon the needs and the type of fishing that the fishing device is used for.

The lure 14 also has a male/female connector pair 76, 78, with one connector 76 at the lure end of the fishing line 12 and the other connector 78 on the lure itself. A water-tight lid 80 may be closed over the connectors 76, 78 so that water does not interfere with the current in the wires. As FIG. 3 shows, the connector 78 preferably has springs 75 to improve the mechanical fastening and electrical connection of the connector 76. The lure 14 is, preferably, made of a suitable silicon material and includes a stabilizing frame 82. The frame 82 may, for example, look like a skeleton of a fish to make the lure look like a small fish. The connector 76 may be disposed in a pocket formed within the frame 82. A vibrating body ("vibrator") 85, such as a simple electrical rotating motor driving amass mounted eccentrically on its shaft, or a piezoelectric vibrator (to generate higher frequency vibrations), is disposed inside the frame 82 to imitate the movement of live bait.

The lure 14 also preferably has a call light 84 connected via wire 93, connector 78 and the wire 68 to attract fish. The light 84 may blink in different colors such as red, green, yellow and orange to make the fish curious and attract the fish to the lure 14.

An important feature of the lure 14 of this invention is the automatic activation of a fish hook 86. The fish hook 86 penetrates through a silicon plate 88 that permits movement of a shank 90 of the hook 86 while ensuring that no water leaks into the lure 14. The thickness of the plate 88 may be varied to set the sensitivity of a sensor 98. By making the plate 88 very thin the sensitivity of the sensor 98 increases because the hook 86 will move easier within the sensor 98 as the plate 88 bends and deforms—the thicker the plate, the more it will resist pivoting of the hook.

An eye 92 of the hook 86 is operatively attached to a pivoting, contact arm 94 that has an end 96 that is movable into an out of electrical contact with a sensor 95, which may be a simple contact plate, but which, in the preferred embodiment of the invention, is an electrically conductive, substantially cylindrical (or at least internally open) sensor housing 98. For example, the sensor 95 may be activated when the end 96 hits an inside wall 99 of the sensor housing 98. A conductor 100 connects the sensor to the wire 66 when the connector 76 is plugged into the connector 78. There is thus an electrical circuit from the battery, along one of the wires 65, through the wire 66 in the connector 76, along the wire 100 to the electrical contact surface 99 of the sensor housing 98. When the end 96 of the pivot arm 94 of the hook touches the contact surface 99, the series circuit is completed via the pivot 92, which is connected to the grounding device (here, the frame 82) via any form of connector such as a simple conductive strap 97. Completion of the circuit triggers an activation signal in the wire 100 and then via the wire 66 and the internal wires of the spinning reel 24 back to a computer chip 102 connected to the electrical motor 32. When the chip 102 receives the activation signal from the lure 14, a pull signal is sent to the electrical motor 32 to reel in the lure 14 at a very rapid speed for two or three meters to hook the fish. The reeling may then be slowed down so as not to lose the fish. The chip thus acts as an active, series-connected switch between the voltage source and the motor.

Alternatively, the chip may be replaced by a latching relay that is closed by the activation signal. When closed, the series connection from the voltage source, through the motor, the relay, and through the sensor will also be closed and the motor may reel in the line until the relay is once again opened. One way to accomplish this is by using the shut-down sensor 108 described below.

The sensitivity of the sensor 95 may be set so that it reacts sooner than the fisherman normally would feel vibration in the rod. By connecting the lightbeeper 50 in series with the sensor 95, the signal in the wire 66 may also generate an activation light and/or activation sound on the butt grip to alert the fisherman. It is possible to disengage the electrical motor 32 and only have the beep signal and activation light connected should the fisherman so prefer.

Another circuit is formed from the battery, through the switch 46 (when in the rear position as shown in FIG. 1), via a different one of the wires 65, via wire 68 in the connector 76, the wire 93, and through the vibrator 85 and light 84 (which are preferably connected in parallel) to ground. When the user activates the switch 46, the vibrator will therefore vibrate and the light will light up and attract fish.

The fishing line 12 may also be provided with an automatic shut-down device 106 attached to the fishing line 12 to stop the automatic reeling in of the lure 14 when the device 106 hits a shut-down sensor 108 on the rod 28. In this way, the fishing line 12 will not be reeled in too far and the electrical motor 32 is automatically turned off. For example, a distance between the device 106 and the lure 14 may be about 2 meters or so.

One way to arrange the shut-down sensor 108 is a simple spring-biased switch with an electrical contact arm that is mounted at the tip of the rod and is electrically connected in series with the computer chip (or relay). When the device, such as a simple stopper, is reeled in to the tip of the rod, it will push against the contact arm and either break the series connection and thus the activation signal, or causes a second shut-down signal to be sent to the chip or to a reset terminal of the relay.

In order to hold the lure on the end of the fishing line without putting stress on the connector 76, the lure is preferably attached to the end of the line 12 using any conventional arrangement, such as a clip 150 and an eye 152. The Attachment point should be far enough from the connector 76 that there will always be a slight slack in the line between the clip 150 and the connector.

It should be understood, the: fishing device of this invention may be used as a conventional manual spinning reel also by using the handle 104 without activating the electrical motor. It should also be understood that it is not necessary to use a very thin fishing line to maintain the sensitivity of the fishing rod that is usually a requirement because the sensor 95 senses the fish independently of the thickness of the fishing line. It is also possible to include only the motoring features without using the electric fishing line so that a conventional fishing line and lure may be used.

I claim:

1. A fishing arrangement comprising:
   a rod;
   a reel that has a line spool and is mounted on the rod;
   an electric motor mounted within the reel;
   a transmission connecting the motor to the line spool;
   a lure;
   a hook mounted in the lure;
   a line with ends attached to the lure and the reel, respectively;
   a voltage source connected to the motor;
   a sensor mounted within the lure;
   first and second electrical conductors that lead from the reel to the lure;
   a first connection arrangement connecting the first and second electrical conductors connecting the voltage source to the sensor;
   in which:
      an inner portion of the hook extends within the lure and forms an electrical contact arm connected in series with the sensor;
      in a ready position, the contact arm of the hook is at a distance from a contact surface of the sensor, the series connection between the voltage source and the sensor thereby being broken;
      in an activated position, the contact arm of the hook touches the contact surface of the sensor and closes the series connection between the voltage source and the sensor; and
      when the series connection between the voltage source and the sensor is closed, the motor is also activated, whereby the motor rotates the line spool and reels in the line and lure.

2. An arrangement as in claim 1, in which the hook extends through a silicon plate in the lure, the silicon plate forming means for both sealing the interior of the lure and for adjusting the sensitivity of the sensor with respect, the sensitivity of the sensor increasing with decreasing thickness of the plate.

3. An arrangement as in claim 1, further including stopping means for disengaging the motor when the line and lure are reeled in to a predetermined distance from the tip of the rod.

4. An arrangement as in claim 1, in which the voltage source is a battery housed within a grip of the rod.

5. A fishing arrangement comprising:
   a rod;
   a reel that has a line spool and is mounted on the rod;
   an electric motor mounted within the reel;
   a transmission connecting the motor to the line spool;
   a lure;
   a hook mounted in the lure;
   a line with ends attached to the lure and the reel, respectively;
   a voltage source connected to the motor;
   a sensor mounted within the lure;
   an electrically activated fish-attracting device mounted within the lure;
   first, second and third electrical conductors that lead from the reel to the lure;
   a first connection arrangement connecting the first and second electrical conductors connecting the voltage source to the sensor;
   a second connection arrangement that connects the second and third electrical conductors and thereby also the voltage source to the fish-attracting device;
   in which:
      an inner portion of the hook extends within the lure and forms an electrical contact arm connected in series with the sensor;
      in a ready position, the contact arm of the hook is at a distance from a contact surface of the sensor, the series connection between the voltage source and the sensor thereby being broken;
      in an activated position, the contact arm of the hook touches the contact surface of the sensor and closes the series connection between the voltage source and the sensor; and
      when the series connection between the voltage source and the sensor is closed, the motor is also activated, whereby the motor rotates the line spool and reels in the line and lure.

* * * * *